US008250402B2

(12) United States Patent
Clark et al.

(10) Patent No.: US 8,250,402 B2
(45) Date of Patent: Aug. 21, 2012

(54) METHOD TO PRECONDITION A STORAGE CONTROLLER FOR AUTOMATED DATA COLLECTION BASED ON HOST INPUT

(75) Inventors: Brian D. Clark, Tucson, AZ (US); Beth A. Peterson, Tucson, AZ (US); Juan A. Coronado, Tucson, AZ (US); Warren K. Stanley, Loveland, CO (US); Raul E. Saba, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1185 days.

(21) Appl. No.: 12/053,663

(22) Filed: Mar. 24, 2008

(65) Prior Publication Data

US 2009/0241136 A1  Sep. 24, 2009

(51) Int. Cl.
*G06F 11/00* (2006.01)
(52) U.S. Cl. .................... 714/6.21; 714/42; 714/6.22
(58) Field of Classification Search .............. 714/42, 714/6.2, 6.21, 6.22
See application file for complete search history.

(56) References Cited

U.S. PATENT DOCUMENTS

| | | | | |
|---|---|---|---|---|
| 5,619,644 A * | 4/1997 | Crockett et al. | ............... | 714/45 |
| 6,600,614 B2 * | 7/2003 | Lenny et al. | ................... | 360/31 |
| 6,754,854 B2 | 6/2004 | Kurrasch | ..................... | 714/47 |
| 6,947,957 B1 | 9/2005 | Lange | ........................... | 707/200 |
| 7,080,287 B2 * | 7/2006 | Salem | ........................ | 714/38.11 |
| 7,111,206 B1 | 9/2006 | Shafer et al. | ..................... | 714/48 |
| 2004/0024726 A1 * | 2/2004 | Salem | ................................ | 707/1 |
| 2004/0025077 A1 * | 2/2004 | Salem | ................................ | 714/2 |
| 2005/0081156 A1 | 4/2005 | Clark et al. | .................... | 715/736 |
| 2005/0240826 A1 * | 10/2005 | Dickenson et al. | ............. | 714/42 |
| 2006/0195731 A1 * | 8/2006 | Patterson et al. | ............. | 714/723 |
| 2008/0270776 A1 * | 10/2008 | Totolos et al. | .................... | 713/1 |

OTHER PUBLICATIONS

Lecointe, F., "High Speed Data Mover Software Prototype Publishable version", (Apr. 19, 2007), pp. 1-33 [retrieved from http://www.sivss.org/ex/sivss/D8.1%20High%20Speed%20data%20mover%20SW-revD.pdf on Oct. 6, 2011].*

* cited by examiner

Primary Examiner — H. S. Sough
Assistant Examiner — Brian Wathen
(74) Attorney, Agent, or Firm — Hamilton & Terrile, LLP; Stephen A. Terrile

(57) ABSTRACT

An FTDC interface with the host or user. The interface can include a command application programming interface (API) or a data storage Command-Line Interface (DS CLI)/Graphical User Interface (GUI). In certain embodiments, the FTDC interface allows a host or user to customize a desired FTDC on a two-tiered system. The first tier is one in which a host/user selects, from a list of conditions, which ones, upon occurrence of those conditions, they would like the controller to perform FTDC. In the second tier a second selection is made such that for each first tier item, the host/user will select the level of FTDC (collection and offloading of logs and/or the forcing and offloading of a statesave).

18 Claims, 3 Drawing Sheets

METHOD TO PRECONDITION A STORAGE CONTROLLER FOR AUTOMATED DATA COLLECTION BASED ON HOST INPUT

BACKGROUND OF THE INVENTION

1. Field of the Invention

The present invention relates in general to the field of computers and similar technologies, and in particular to software utilized in this field. Still more particularly, the present invention relates to preconditioning a storage controller for automated data collection.

2. Description of the Related Art

Storage controllers, such as those available from the International Business Machines Corporation, are known. In storage controllers, it is known for an enterprise storage server to manage Input/Output (I/O) requests from networked hosts to one or more storage units, such as a direct access storage device (DASD), Redundant Array of Independent Disks (RAID Array), and Just a Bunch of Disks (JBOD). Storage controllers include host bus adapters or interfaces to communicate with hosts over a network and adapters or interfaces to communicate with the storage units.

Data integrity is an important factor in large computer data systems. Thus, backup systems have been developed and integrated into storage controllers to prevent the loss of data in the event of various types of failures. If an error occurs on a storage controller, it is desirable to provide a first time data capture or collection (FTDC) type function (also referred to as first failure data capture (FFDC) type function) which can support analysis of the error and eventually enable obtaining a root cause and/or resolution of that error. With a FTDC type system, much of the data collection, such as error report (errpt) data, trace logs, etc., is automatically gathered but is not automatically offloaded. This automatically collected data is often collected in a round robin basis so that new data overlays older data in the collection. This overlay function means that if these logs are not offloaded until well after an error event, the pertinent data can be lost.

Another important aspect of a data collection system is known as a statesave operation, in which control and data structures are accumulated and off-loaded when a statesave is triggered. Many error events can automatically trigger these statesaves (e.g., panics, data storage interrupts (DSIs)), but there are some error events in which automatic triggers are not set because the condition is not necessarily considered an error. Some examples of these pseudo-error conditions include selective resets, system resets, Peer-to-Peer Remote Copy suspends of paths or pairs. Additionally, some of these conditions are not considered errors until some form of threshold is crossed. A notable example of this type of issue is a performance problem where, as long as response time or throughput (e.g., in MB/sec) stays below or above, respectively, some defined threshold, no problem is identified. However, when the thresholds are exceeded, the user/host is impacted. In all these examples, a statesave can be manually forced or forced by triggers set in host software. However, such a manual statesave operation is often well after the event and as such, data critical to the analysis is no longer in the collected data.

Accordingly, it is desirable to allow a user or host to define automated FTDC for both automatically collected data and for pseudo error type conditions based on the environments and needs of a customer.

SUMMARY OF THE INVENTION

In accordance with the present invention, an FTDC interface with the host or user is provided. The interface can include a command application programming interface (API), a data storage Command-Line Interface (DS CLI), or a Graphical User Interface (GUI). In certain embodiments, the FTDC interface allows a host or user to customize a desired FTDC on a two-tiered system. The first tier is one in which a host/user selects, from a list of conditions, which ones, upon occurrence of those conditions, they would like the controller to perform FTDC. The second tier a second selection such that for each first tier item, the host/user will select the level of FTDC (collection and offloading of logs and/or the forcing and offloading of a statesave).

More specifically, in one embodiment, the invention relates to a computer-implementable method for providing a first time data collection (FTDC) function to a storage controller. The method include providing an FTDC interface, the FTDC interface allowing a host to interface with the storage controller; and, enabling customization of an FTDC operation operating on the storage controller via the FTDC interface.

In another embodiment, the invention relates to a system that includes a processor; a data bus coupled to the processor; and a computer-usable medium embodying computer program code, the computer-usable medium being coupled to the data bus. The computer program code includes instructions executable by the processor and configured for providing a first time data collection (FTDC) interface, the FTDC interface allowing a host to interface with the storage controller; and, enabling customization of an FTDC operation, operating on the storage controller via the FTDC interface.

In another embodiment, the invention relates to a computer-usable medium embodying computer program code. The computer program code includes computer executable instructions configured for: providing a first time data collection (FTDC) interface, the FTDC interface allowing a host to interface with the storage controller; and, enabling customization of an FTDC operation operating on the storage controller via the FTDC interface.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
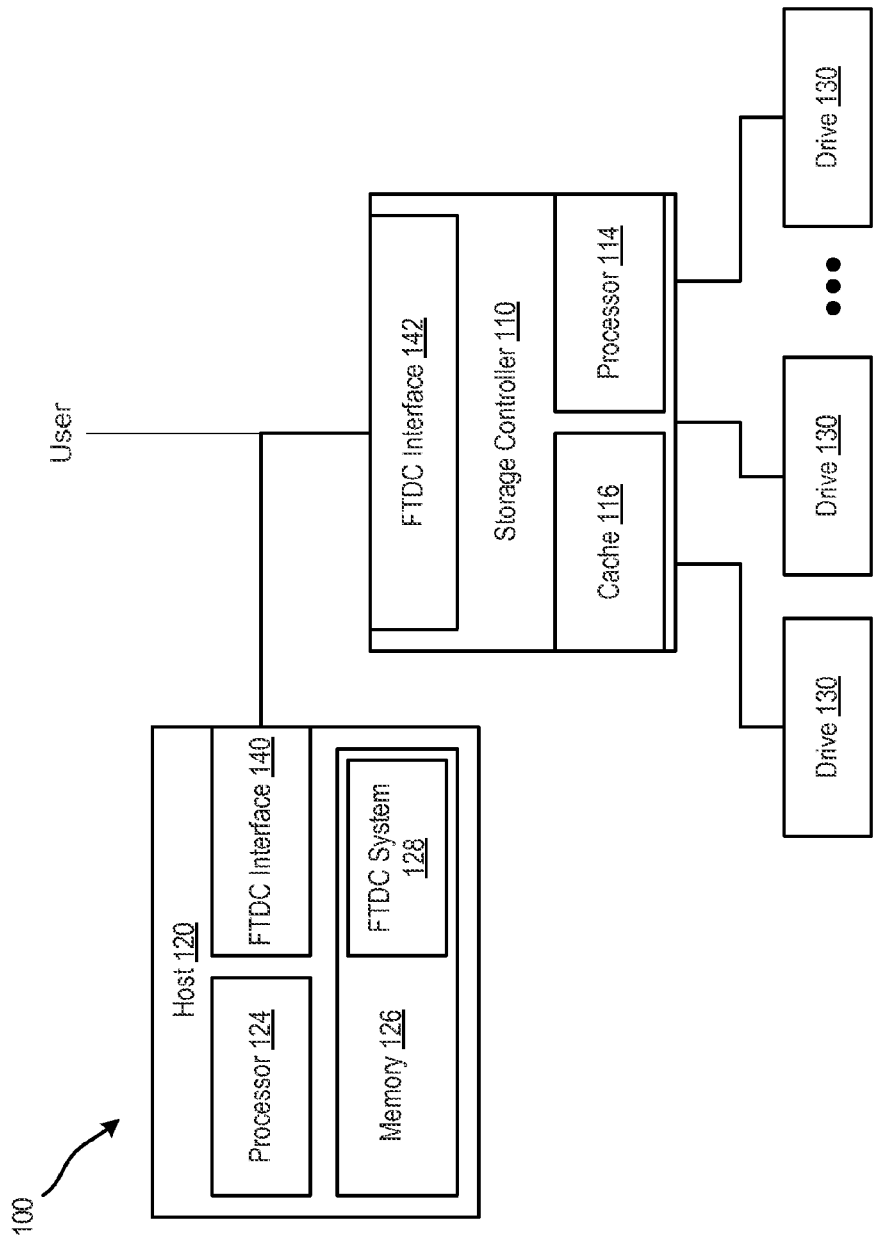
FIG. 1 shows a block diagram of a storage system in which the present invention may be implemented.

FIG. 1 shows a block diagram of a storage system 100, which can be a RAID system in which the present invention may be implemented. The system 100 includes a storage controller 110 that can be a RAID controller coupled to a host or client 120. The storage controller 110 is also coupled to a disk array 130 that includes two or more disk drives. The storage controller 110 also includes a processor 114 that processes commands received from the host 120 and executes storage drive routines. The storage controller 110 may also include a cache 116 for temporary storage of recently or often accessed data.

The host 120 includes a processor 124 that executes routines and issues read and write commands to the storage controller 110. The host 120 also includes memory 126, which can include volatile and non-volatile memory. A FTDC system 128 is stored on the memory 126 and may be executed by the processor 124. The storage controller 110 interacts with and controls a plurality of drives 130. The host 120 and the storage controller 110 each include a respective FTDC interface, 140, and 142.

Figure 2:
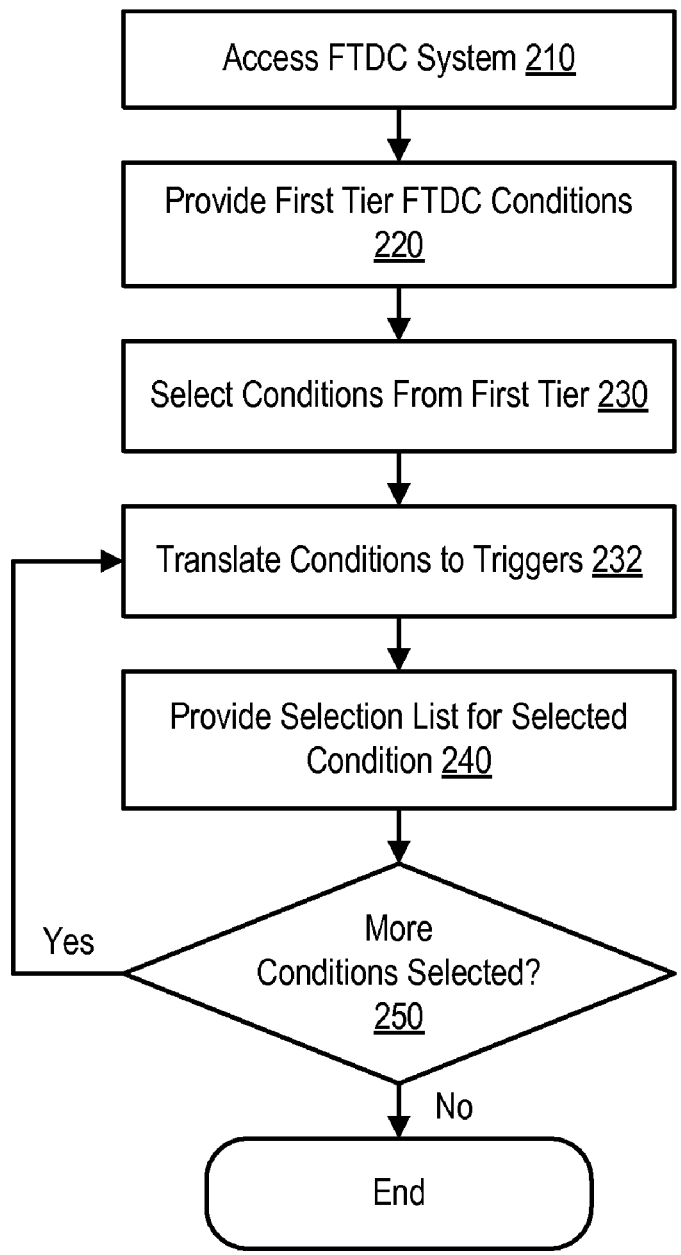
FIG. 2 shows a flow chart of the operation of a FTDC system.

Referring to FIG. 2, within the FTDC interface when an FTDC system is accessed at step 210, two selection lists are presented a two tier selection process is presented). More specifically, with a first list at step 220, the host/user selects conditions under which FTDC will occur on the controller at step 230. These conditions are then translated into appropriate triggers on the controller at step 232. For each condition selected from the first list, a second selection list is presented at step 240. In this list, the host/user can select from a plurality of types of FTDC information.

Next at step 250, the FTDC system determines whether there are any remaining conditions. To prevent multiple FTDC operations from occurring in the case of recursive/reoccurring errors, either internal or host/user selected limits on the number of FTDCs may be set. This limit can be based on a number of FTDC operations or a time between FTDC operations. This interface may be modified at any time by the host/user and these current settings will survive controller initial machine loads (IMLs).

Figure 3:
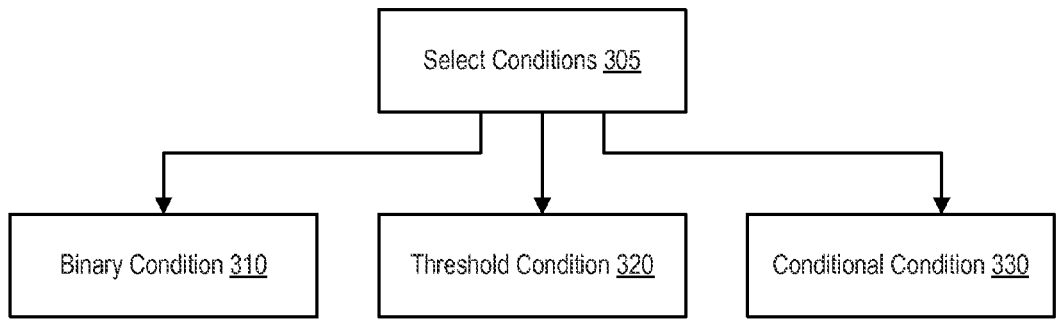
FIG. 3 shows a flow chart of the operation of a select condition operation of a FTDC system.

FIG. 3 shows a flow chart of the operation of a select condition operation 305 of a FTDC system. More specifically, when selecting conditions, a user may select a binary condition at step 310 (e.g., a condition which includes either a pass or fail (i.e., yes/no) condition. A user may also select a threshold condition, where the FTDC operation will occur if a certain threshold value is either exceeded or not exceeded at step 320. A user may also select a conditional condition (e.g., an if/then type of condition) at step 330.

Some of these conditions may involve setting threshold values and for these conditions, additional input will be allowed beyond the binary "yes/no."

Figure 4:
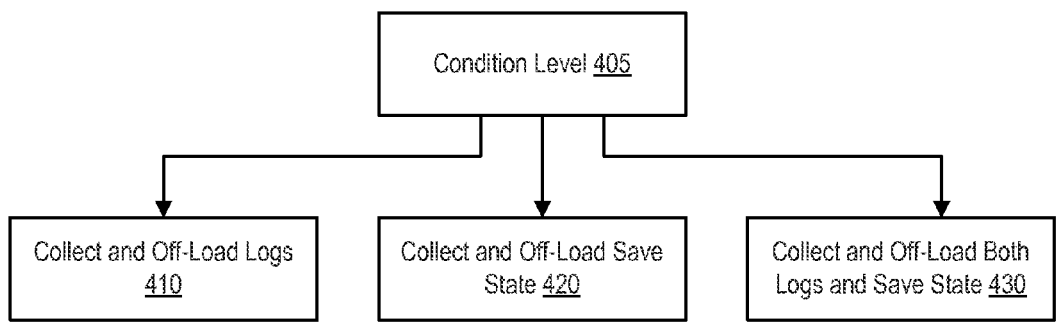
FIG. 4 shows a flow chart of the operation of a condition level operation of a FTDC system.

FIG. 4 shows a flow chart of the operation of a condition level operation 405 of a FTDC system. More specifically, in certain embodiments, when selecting from any of a plurality of types of FTDC information, a user may select to collect and offload logs (e.g. to a product engineering (PE) package) at step 410. A user may select to collect and offload statesave only at step 420. Additionally, a user may select to collect and offload both logs and statesave at step 430.

The described system may be implemented as a method, apparatus, or article of manufacture using standard programming and/or engineering techniques to produce software, firmware, hardware, or any combination thereof. The term "article of manufacture" refers to code or logic implemented in hardware logic (e.g., magnetic storage medium such as hard disk drives, floppy disks, and tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. Those skilled in the art will recognize the article of manufacture may comprise any information-bearing medium known in the art.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method for providing a first time data collection (FTDC) function to a storage controller comprising:
providing an FTDC interface, the FTDC interface allowing a host to interface with the storage controller; and,
enabling customization of an FTDC operation operating on the storage controller via the FTDC interface; and wherein
the FTDC operation comprises a two tiered operation, a first tier of the two tiered operation enabling a user to identify a condition from a list of conditions where detection of the condition causes initiation of an FTDC operation and a second tier of the two tier operation enabling a user to select a level of data collection for the condition so identified.

2. The method of claim 1 wherein:
the condition is selected from a list of conditions comprising binary conditions, threshold conditions and conditional conditions.

3. The method of claim 1 wherein:
the level of data collection comprises at least one of a collect and offload log operation, a collect and offload save state operation and a collect and offload log and save state operation.

4. The method of claim 1 wherein:
the enabling customization of the FTDC operation enables collection of FTDC data for pseudo error conditions based upon at least one of detection of predetermined threshold values or an occurrence of predetermined conditions.

5. The method of claim 4 wherein:
the pseudo error conditions comprise at least one of a selective reset, a system reset, and a Peer-to-Peer Remote Copy suspend of paths or pairs.

6. The method of claim 1 wherein:
the FTDC interface comprises at least one of an application programming interface (API), a data storage Command-Line Interface (DS CU), and a Graphical User Interface (GUI).

7. A system comprising:
a processor;
a data bus coupled to the processor; and
a computer-usable medium embodying computer program code, the computer-usable medium being coupled to the data bus, the computer program code comprising instructions executable by the processor and configured for:
providing a first time data collection (FTDC) interface, the FTDC interface allowing a host to interface with the storage controller; and, enabling customization of an FTDC operation operating on the storage controller via the FTDC interface; and wherein the FTDC operation comprises a two tiered operation, a first tier of the two tiered operation enabling a user to identify a condition from a list of conditions where detection of the condition causes initiation of an FTDC operation and a second tier of the two tier operation enabling a user to select a level of data collection for the condition so identified.

8. The system of claim 7 wherein:

the condition is selected from a list of conditions comprising binary conditions, threshold conditions and conditional conditions.

9. The system of claim 7 wherein:

the level of data collection comprises at least one of a collect and offload log operation, a collect and offload save state operation and a collect and offload log and save state operation.

10. The system of claim 7 wherein:

the enabling customization of the FTDC operation enables collection of FTDC data for pseudo error conditions based upon at least one of detection of predetermined threshold values or an occurrence of predetermined conditions.

11. The system of claim 10 wherein:

the pseudo error conditions comprise at least one of a selective reset, a system reset, and a Peer-to-Peer Remote Copy suspend of paths or pairs.

12. The system of claim 7 wherein:

the FTDC interface comprises at least one of an application programming interface (API), a data storage Command-Line Interface (DS CLI), and a Graphical User Interface (GUI).

13. A non-transitory computer-usable medium embodying computer program code, the computer program code comprising computer executable instructions configured for:

providing a first time data collection (FTDC) interface, the FTDC interface allowing a host to interface with the storage controller; and, enabling customization of an FTDC operation operating on the storage controller via the FTDC interface; and wherein the FTDC operation comprises a two tiered operation, a first tier of the two tiered operation enabling a user to identify a condition from a list of conditions where detection of the condition causes initiation of an FTDC operation and a second tier of the two tier operation enabling a user to select a level of data collection for the condition so identified.

14. The computer-usable medium of claim 13, wherein:

the condition is selected from a list of conditions comprising binary conditions, threshold conditions and conditional conditions.

15. The computer-usable medium of claim 13, wherein:

the level of data collection comprises at least one of a collect and offload log operation, a collect and offload save state operation and a collect and offload log and save state operation.

16. The computer-usable medium of claim 13, wherein:

the enabling customization of the FTDC operation enables collection of FTDC data for pseudo error conditions based upon at least one of detection of predetermined threshold values or an occurrence of predetermined conditions.

17. The computer-usable medium of claim 16, wherein:

the pseudo error conditions comprise at least one of a selective reset, a system reset, a Peer-to-Peer Remote Copy suspend of paths or pairs.

18. The computer-usable medium of claim 16, wherein:

the FTDC interface comprises at least one of an application programming interface (API), a data storage Command-Line Interface (DS CLI), and a Graphical User Interface (GUI).

* * * * *